Patented May 16, 1939

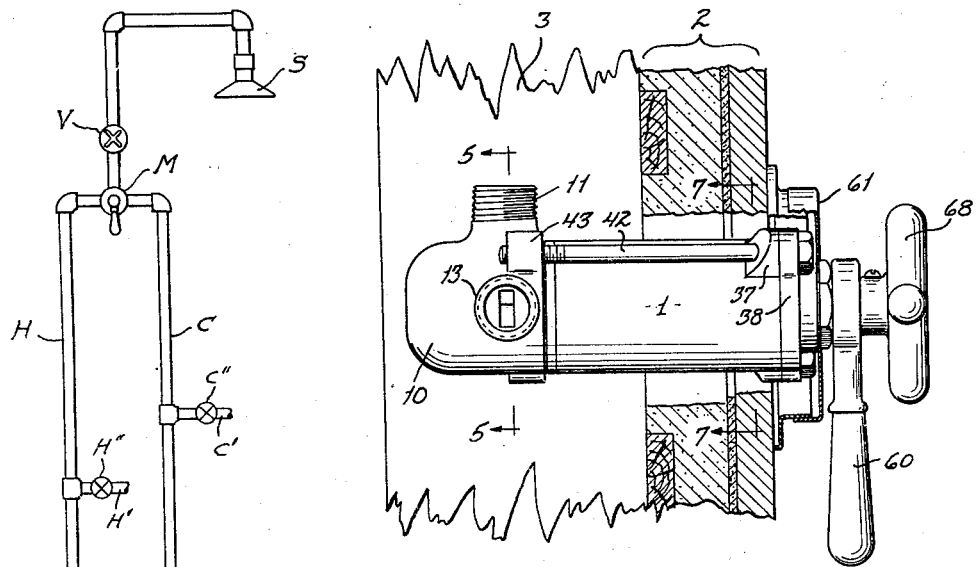
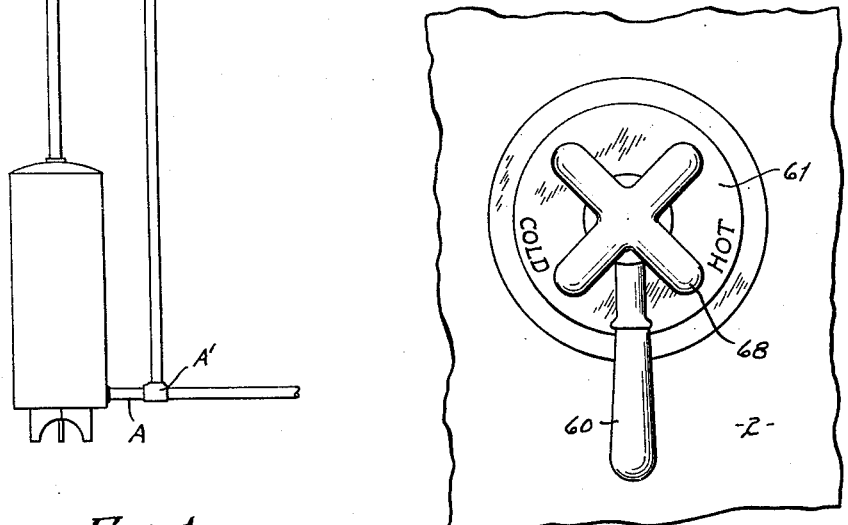

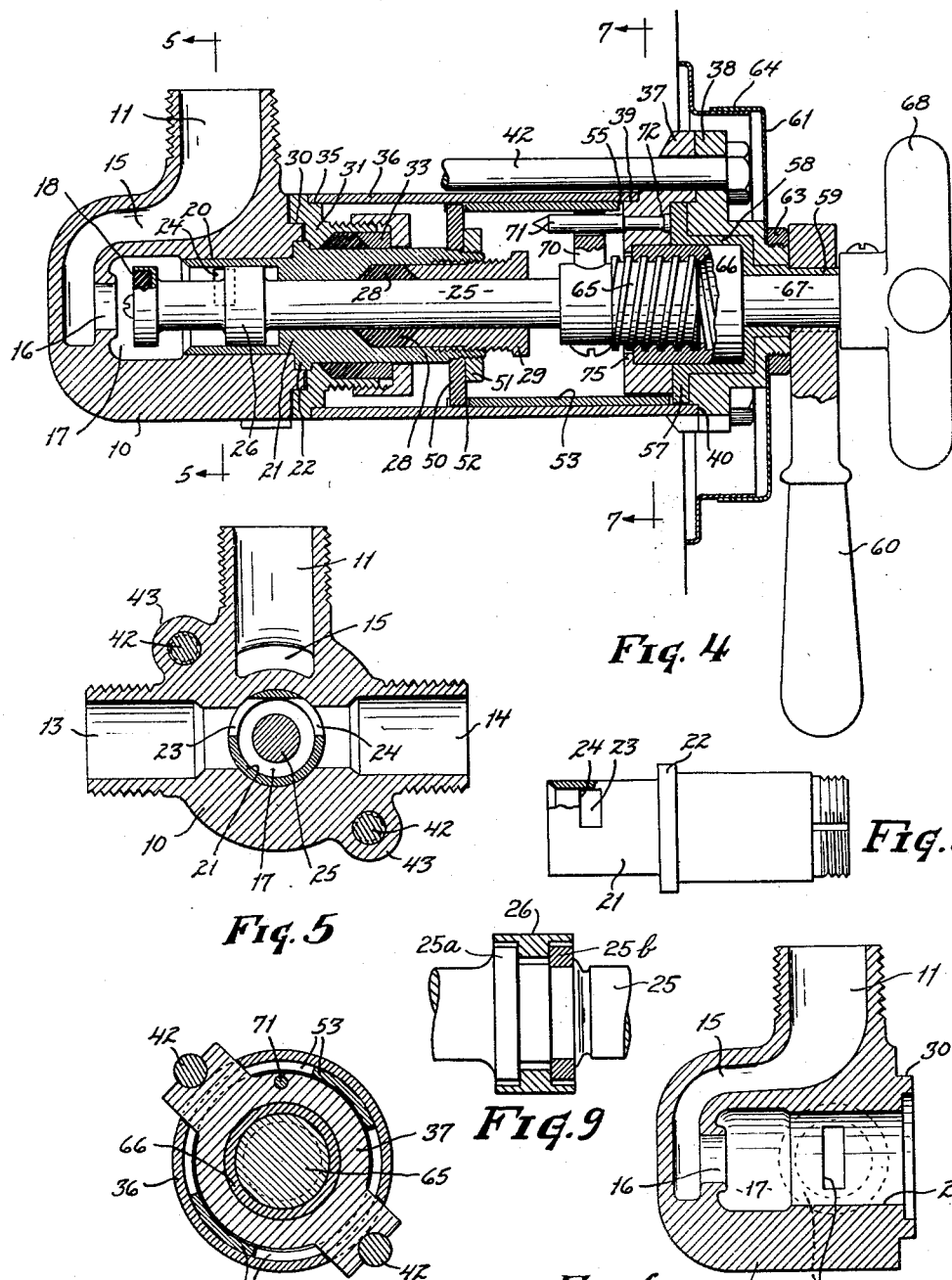

2,158,342

UNITED STATES PATENT OFFICE 2,158,342

MIXING AND CONTROL DEVICE FOR FLUIDS

Wilbur S. Trader, Charles H. Hamilton, and Walter H. Finley, Nashville, Tenn.

Application May 6, 1937, Serial No. 141,098

3 Claims. (Cl. 277—18)

This invention relates to a control apparatus or device for fluids, and particularly for mixing fluids in variable proportions and discharging the mixture. The particular illustration represents a mixing and control valve for hot and cold water. The primary object is to provide a unitary mixing valve, which, when not performing its mixing function, will allow substantially no interchange between the hot and cold water in a plumbing system, and may be operated to turn on water at any desired volume, or turn off water entirely, without having to disturb the setting of the valve for mixing.

Another object is to provide an improved valve of the bibcock type.

Another specific object is to provide a leakproof unitary valve construction for both mixing hot and cold water, and regulating the volume of discharge independently of the ratio of supply of the hot and cold water.

Still another object is to provide a valve construction adapted to serve both as a mixer and main shut-off for water, which may be made economically and be capable of being easily assembled, disassembled and adjusted.

Other objects and features of the invention will become apparent from the following description, relating to the accompanying drawings, which illustrate a preferred form. The essential characteristics are summarized in the claims.

Referring to the drawings, Fig. 1 is a diagram showing the relationship of the valve apparatus hereof to a hot and cold water supply system of the usual type; Fig. 2 is a side elevation of the valve apparatus in a form suitable for controlling water for bathing; Fig. 3 is a front view showing the control handles and escutcheon plate for indicating the character of the mix, etc.; Fig. 4 is a transverse, central sectional view of the valve taken in a vertical plane; Fig. 5 is a transverse, sectional view, taken along the line 5—5 on Fig. 2; Fig. 6 is a fragmentary view, similar to the left-hand portion of Fig. 4, omitting the valve plug arrangement; Fig. 7 is a sectional view taken at 7—7, Figs. 2 and 4; Fig. 8 is a side view of a mixing valve sleeve, and Fig. 9 is a central sectional view of the preferred mixing valve plug, a portion of the operating stem of which is shown in elevation.

Fig. 1 is principally illustrative of the problems presented by mixing and control valves for showers and the like. Only so much of the system as relates directly to the supply as to a shower or like functioning apparatus is shown. Cold water is admitted to the tank as through a line A, and hot water leads from the tank toward the shower S as at H. A cold water branch line C is shown connected to the main A as at A'. Branch lines for supplying hot and cold water to other parts of the building are indicated at H' and C', and these may be controlled by any suitable arrangement of valves such as indicated at H'' and C''. The lines H and C come together at the mixing valve, shown diagrammatically at M, and for simplicity of illustration the main shut-off of the mixing valve V is shown separately from M. It is of course, highly important that the mixing valve be so arranged that an interchange between hot and cold water in the system cannot take place when the shower is not operating, for at such time there is a slight differential of pressure between the hot and cold water and leakage (interchange) would waste heat. Normally this pressure differential (hereinafter D. P.) is approximately .36 pound per square inch. This may be greater or less, depending upon the temperature difference between the hot and cold water in the system and the height of the hot water column. Since the hot water line leading to the mixing valve usually cools off when the valve is not in use, the D. P. is much less for the greater part of the time the shower is idle, and at such times interchange does not take place as a practical matter.

Should the branch cold water line C' be operated there will be a drop in pressure at the cold side of the mixing valve, and this obviously would increase the D. P. above the value (.35) mentioned above. The drop of pressure we are accustomed to, when a faucet is opened, results from the pipe friction all the way from the faucet to the street, through the meter, and corporation cock. In this case, however, a drop will be due to friction only in the pipe between C' and A and any drop between the main A and the street will be effective on both the cold and hot sides of the system. It is evident, then, that the mixing valve would not ordinarily be subjected to any considerable pressure difference, and it is also evident that a slight leak between the hot and cold water line at the mixing valve will be unnoticed, insofar as hot water loss is concerned, and therefore of no practical importance.

The above discussion is deemed necessary because the present arrangement employs as a shut-off in the mixing valve, a cylindrical plug which slides in a sleeve having opposite ports as a closure to prevent interchange during idle periods. Such sleeve type valves, oddly enough, are not ordinarily accepted in household plumbing fixtures; although, the principle is found effective in other hydraulic pressure systems where from two thousand to four thousand pounds per square inch pressures are involved.

It will be seen that the general scheme is to connect the hot and cold lines at a mixer which will proportion the common discharge from hot to cold; then on said discharge to place a valve which will (I) close the discharge to the air; (II) when so closed prevent intermingling of the hot and cold water in the system and (III) regulate the volume of water discharged from the common channel, without interfering with the mixing adjustment while any of these functions are being performed. It should also be borne in mind that there is the further objective, namely, to provide for carrying out the above functions in one self-contained device, which may be conveniently installed, adjusted and repaired.

Referring further to Fig. 2, this shows the manner in which the valve device 1, (M—V on Fig. 1), comprising several parts to be later described in detail, is set into the usual building construction, so that the feed and discharge pipes are behind the plaster or other finish. The aggregate building parts, indicated at 2, represent the usual lath, plaster and tiling, as in a bathroom. 3 represents one of the usual studs to which the finishing assembly 2 may be attached. The principal mounting for the valve 1 comprises the pipes H and C, (see Fig. 1; omitted from Fig. 2). A suitable coupling for connection with the (e. g.), shower S is attached to the upstanding threaded extension 11.

The character of the valve body can best be seen in Figs. 4 to 8; and the body may include an end section 10, (Figs. 4 and 5) provided with the upstanding threaded portion 11, and two laterally extending threaded branches 13 and 14 for suitable connection with the hot and cold water lines H and C.

The hollow interior of the extension 11 communicates as by a curved passage 15, with a central discharge port 16 of a valve chamber 17. The main closure plug for said port is of the bibb type, having a compression washer, the head assembly 18 of which plug is moved by a stem 25 inside the chamber 17 to open and close the port 16. Said closure plug operates substantially as a bibcock with the exception that in the present instance there is no relative turning between the compression washer and seat, and hence there is little likelihood of mutilation of the compression washer, in case the seat or washer become defective for any reason.

Adjacent the valve chamber 17, the section 10 is bored cylindrically as at 20 to receive a rotary sleeve 21, shouldered as at 22 into a cylindrically machined seat or counterbore adjacent the bore 20, so that the left-hand end of the sleeve as shown in Fig. 4, can be turned to function as the mixing adjuster in cooperation with the lateral inlets in the section 10. The sleeve, as shown in Fig. 5, has ports 23 and 24 adapted to align in different positions of the sleeve, with said lateral inlets of 13 and 14, so that water can pass from both into the valve chamber 17 past the stem of the bibb type closure.

As shown in Fig. 5, the ports 23 and 24 are positioned for equal proportioning of hot and cold water. When turned from this position the mixture is varied as can be seen from inspection of the drawings. The hot and cold water passes from the sleeve 21 into the chamber 17, thence outwardly to the common discharge. A cylindrical plug or head 26 on the stem 25 is withdrawn to uncover the sleeve ports 23 and 24 whenever the stem is withdrawn to open the bibcock. When the bibcock closes, the head 26 prevents any interchange of water, as from hot to cold. Preferably, the cylindrical plug 26 floats freely laterally of the stem, as by reason of the construction shown in Fig. 9 wherein an inner rib 26a on the plug operates between annular members 25a and 25b, one of which is a suitably attached ring separate from the stem to permit assembly. The stem 25 of the bibcock reaches through the sleeve 21 to a control mechanism on the outer end of the valve body (to be later described).

Suitable means for preventing leakage along the stem 25 may comprise packing as at 28, held in place by substantially the usual threaded compression sleeve 29.

Outwardly, from the shoulder 22 on the mixing sleeve 21, the section 10 (Fig. 4) is machined as at 30 to provide a labyrinth joint against which there is seated a sleeve 31, surrounding an outer cylindrical portion of the sleeve 21 as a support. The sleeve 31 has a packing gland and nut assembly 33 of conventional type to prevent leakage along the outer surface of the mixing sleeve. The outer rim portion of the sleeve 31 is machined as at 35, to provide a seat for a housing tube 36 for the various parts mentioned. The right-hand end of the tube (Fig. 4) engages a fitting 37 of a two-part clamping head, including an outside fitting 38. The fitting 37 is machined at 39 to fit the outer end of the tube 36, at the upper portion of the valve body, and the lower side of the fitting 38 is similarly machined to fit the tube at 40. The lower side of the fitting 37 is spaced from the wall of the tube 36 as will be clear from Fig. 7, and on this lower side the tube 36 extends beyond the section 37 into abutment with the shoulder just mentioned. This allows an operating connection to be established between a centrally located handle (later described) and the mixing sleeve, while providing a central support for operating means for the bibcock.

The body parts so far described, namely, the end section 10, the tube 36 and the end fittings 37 and 38, may be held rigidly together by a pair of bolts or studs 42. Studs are shown, which pass through ear formations on the fittings 37 and 38, and similar ear formations 43 on the body section 10. As shown, the studs are threaded on their ends which are at the left in Fig. 2, for connection with the ears 43. The opposite ends of the studs may have fixed heads.

Referring now to the illustrated arrangement for turning the sleeve 21 to vary the mixture of water passing through the extensions 13 and 14, it will be seen that on the outer end of the mixing sleeve 21 there is secured a disc 50, as by a nut 51, the outer rim of the disc having tooth effects thereon for engagement with matching notches 52, on a sleeve 53, which has a free turning fit inside the tube 36. The sleeve 53 is cut away at the top, as at 55, and its lower portion reaches past the fitting 37 for dental engagement with a flange 57 of a sleeve 58 which is adapted for attachment to an adjusting handle outside the body. The last-mentioned sleeve (58) has free turning bearing inside both fittings 37 and 38, and extends outwardly from the right-hand end of the latter as at 59, for connection with an adjusting handle 60 of any suitable form. This handle moves adjacent an escutcheon plate 61, (see Fig. 3) marked to designate "hot" and "cold" water.

The escutcheon plate may be secured to the outer end of the fitting 38, as by a nut 63, and as shown, has separate telescoping parts (overlapping at 64) so that the outer edges of the plate may seat tightly against the tiling or plaster, notwithstanding movement of the body inwardly and outwardly a short distance, as may be necessitated by the variations in the positions of the piping inside the wall.

As previously mentioned, the stem of the bibcock reciprocates but does not turn. Suitable means for effecting reciprocation may comprise a threaded head 65 on one end of the stem (shown at right Fig. 4), fixed as by a screw or pin; which threaded head cooperates with a cylindrical nut 66 on a separate stem section 67 projecting through the reduced end of the sleeve portion 59 of the mixer adjusting sleeve 58. To this may be attached any suitable adjusting means, such as the winged handle 68.

A suitable arrangement for preventing the stem 25 from turning may comprise a bifurcated lateral extension 70 on the shank portion of the threaded head 65; the arms of the extension embracing a pin 71, secured as at 72, to the fixed inner fitting 37, and lying parallel to the stem 25. It will be seen that when the handle 68 is turned, the threaded head 65 will be moved inwardly or outwardly with respect to the cylindrical nut 66; the latter being prevented from moving endwise partly by the sleeve 58, and partly by an inwardly overhanging abutment 75 on the fitting 37.

In cases where it is not considered necessary to house the working parts of the device the reciprocating stem of the bibb type valve may have any suitable pin and slot connection with an outer fixed housing, which latter may then be cut away, as on the bottom of the body, in order to establish turnable connection between the mixer adjustment handle and the mixer sleeve.

It may be mentioned that provision for preventing turning of the stem 25, as an alternative construction, may be associated with the outer end of the bibcock head, as by the provision of suitable longitudinal guide ways on the inside of the valve chamber 17, and tongues on the head adapted to slide but not turn materially in such ways. In other respects the construction may be modified as much as desired for simplification or special adaptation or for any other purpose.

It will be apparent from the above description and the drawings, that the device is operative to effect the various objectives heretofor outlined. It will be noted that the mixing sleeve will operate properly when reversed in position, i. e., turned 180 degrees from that shown in Fig. 5. In such event, if the handle 60 as shown in Fig. 3 is turned to align with the designation "Hot" on the escutcheon, the device will discharge water from the cold line. Therefore, should the plumber reverse the positions of the hot and cold lines or should it be desired to use the device inverted, as for tub use instead of shower (discharge 11 turned downward) then it is only necessary to reverse the position of the assembly, exclusive of part 10, by turning it 180 degrees and interchanging the position of the studs 42 in the ears 43 of the section 10, and to reset the handle 60 in 180 degrees turned position on the sleeve 59 (which may be square for example) in order to reconcile the movement of the handle with the instructions on the escutcheon.

We claim:

1. A mixing valve comprising a body having a three-port valve chamber, turnable means operatively arranged relative to two of the ports variably to mix fluid admissible to the valve chamber therethrough, reciprocable means which is adjustable independently of the turnable means to block and unblock the third port, a sliding connection between the body and reciprocable means to prevent turning of the reciprocable means, and screw thread mechanism to operate the reciprocable means, said mechanism including a threaded element inside the body and which is fixed against axial movement relative to the body, said element having an operating part extending outside the body.

2. A mixing valve comprising a hollow body having means forming a three-port valve chamber, a sleeve turnably mounted in said means and operatively arranged relative to two of the ports variably to mix fluid admissible to the valve chamber therethrough, and means slidably supported inside the sleeve, keyed to the body inside the latter so that the slidable means cannot turn and being movable to block and unblock the third port, the last named means being arranged to close communication between the two ports when operating to block the third port, the sleeve and slidable means being relatively arranged so that the movement of neither transmits any movement to the other.

3. A mixing valve comprising a body having lateral inlets for the fluid to be mixed, an adjustable sleeve with apertures cooperating with the inlets in a manner to control the mixture, a stem inside the sleeve and an annular plug adapted for blocking the apertures of the sleeve, said splug having radial floating movement on the stem.

WILBUR S. TRADER.
CHARLES H. HAMILTON.
WALTER H. FINLEY.